United States Patent
Suzuki

[11] Patent Number: 6,130,664
[45] Date of Patent: Oct. 10, 2000

[54] INPUT DEVICE

[75] Inventor: Katsutoshi Suzuki, Fukushima-ken, Japan

[73] Assignee: Alps Electric Co., Ltd., Tokyo, Japan

[21] Appl. No.: 09/030,634

[22] Filed: Feb. 25, 1998

[30] Foreign Application Priority Data

Feb. 25, 1997 [JP] Japan .................................. 9-041200

[51] Int. Cl.[7] .................................................. G09G 5/08
[52] U.S. Cl. ........................ 345/158; 345/157; 345/163
[58] Field of Search .................................. 345/145, 156, 345/163, 165, 166, 157, 158

[56] References Cited

U.S. PATENT DOCUMENTS

| | | | |
|---|---|---|---|
| 5,181,181 | 1/1993 | Glynn ........................................ 702/141 |
| 5,296,871 | 3/1994 | Paley ........................................ 345/163 |
| 5,305,181 | 4/1994 | Schultz ..................................... 361/680 |
| 5,396,265 | 3/1995 | Ulrich et al. ............................. 345/158 |
| 5,477,237 | 12/1995 | Parks ........................................ 345/156 |
| 5,506,605 | 4/1996 | Paley ........................................ 345/163 |
| 5,554,980 | 9/1996 | Hashimoto et al. ................... 340/825.72 |
| 5,561,445 | 10/1996 | Miwa et al. ............................. 345/163 |
| 5,619,231 | 4/1997 | Shouen ..................................... 345/163 |
| 5,680,157 | 10/1997 | Bidiville et al. ........................ 345/165 |
| 5,754,168 | 5/1998 | Maynard, Jr. ............................ 345/163 |
| 5,784,052 | 7/1998 | Keyson ..................................... 345/167 |
| 5,936,612 | 8/1999 | Wang ........................................ 345/164 |

*Primary Examiner*—Richard A. Hjerpe
*Assistant Examiner*—Henry N. Tran
*Attorney, Agent, or Firm*—Brinks Hofer Gilson & Lione

[57] ABSTRACT

According to the present invention there is provided an input device not requiring a flat operating surface, easy to operate, and capable of being used with a feeling more accurately matching the human sense.

The input device indicated at 1 comprises a case having a bottom a bottom surface having the shape of a cubic curve, two angular velocity sensors housed within the case, a signal processing section for converting sensor output into control signals, and selecting switches. The first angular velocity sensor, whose central axis is fixed along Z axis, detects rotation in a horizontal plane of the input device. The second angular velocity sensor, whose central axis is fixed along X axis, detects rotation in a vertical plane in the longitudinal direction of the input device.

7 Claims, 6 Drawing Sheets

INPUT DEVICE

BACKGROUND OF THE INVENTION

1. Field of the Invention

The present invention relates to an input device suitable for use as a pointing device for inputting a two- or three-dimensional to a storage and processing apparatus such as a personal computer, or as a menu selector used in an image reproducing apparatus such as television, or as a pointing device for presentation.

2. Description of the Prior Art

Heretofore, a mouse, a track ball, and a joy stick have widely been used as input devices for inputting two-dimensional information to a storage and processing apparatus such as a personal computer. As to the mouse, a ball contained in a case rotates as the user moves the mouse on an operating surface such as the surface of a desk and the direction and amount of that rotation are detected functionally, whereby two-dimensional information responsive to the direction and amount of movement of the mouse is provided to the storage and processing apparatus. And the cursor's position on the display of the storage and processing unit is controlled by operating the mouse.

In operating a conventional mouse, however, it is required to move the mouse on a desk or the like and therefore a flat surface having a certain area for operation has so far been needed. Therefore, when there is not sufficient space on a desk, or when a storage and processing apparatus is to be used at any other place than on a desk, as is the case with a portable personal computer, it is very difficult to use the mouse. In addition, dust is apt to be deposited on the surface of the ball of the mouse which is formed of rubber or the like. Once dust stays near a detector for detecting the rotation of the ball, the ball rotation is not securely transmitted to the rotation detector, thus sometimes resulting in malfunction such as the cursor being not responsive to movement of the mouse.

For solving the above-mentioned problem, for example, Japanese Patent Laid-open No. 218824/92 proposes a multi-dimensional information input device having an operating means of a shape easy to be gripped by a user's hand or easy to be attached to a user's joint, shoulder or head and also having angular velocity sensors disposed on X, Y and Z axes which are orthogonal to one another. However, the input device disclosed therein premises its use within a space and, during operation, the user is required to grip the operating means or move it as attached to his or her body. Therefore, it is impossible for the user to withstand a long-time operation and thus a physical limit is encountered physically.

In a conventional mouse, the movement of the mouse and that of the cursor on the display are in a different relation such that as the mouse is moved longitudinally when looking from the user, the cursor moves vertically. Recently, such apparatus as personal computers have come into use even in homes at large in quick tempo, and even people unaccustomed to handling of this type of apparatus tend to use the apparatus. But the beginners will have a sense of incongruity in the difference between the mouse operating direction and the cursor moving direction and will sometimes be unable to move the cursor in a desired direction. Therefore, it has been desired to provide an input device which permits the cursor to be moved by an operation with a feeling closer to the human sense, for not only beginners but also skilled persons.

Recently, moreover, televisions capable of handling two-way communication have also been on sale as home electric products, but this type of television requires a certain information input device for issuing various commands to the television from the user side. For example, when this type of television is used in a living room of a house, the user does not always sit face to face with a table at the time of selecting a menu on the display. The user is required to move the mouse on the table and it is very difficult for the user to use the input device wherein the mouse operating direction and the cursor moving direction are different from each other. Particularly, in the case of an input device for use in a home electric product, it must not cause the user to get tired. Thus, a conventional mouse is quite unsuitable even as an input device for television capable of handling two-way communication. Under the circumstances it has so far been desired to provide a simpler input device capable of being operated more easily.

SUMMARY OF THE INVENTION

The present invention has been accomplished for solving the above-mentioned problems and it is an object of the invention to provide an input device not requiring a flat operating surface, easy to operate, and employable with a feeling closer to the human sense.

According to the present invention, in order to achieve the above-mentioned object, there is provided, particularly as an input device for inputting two-dimensional information to an information processor, an input device composed of a case having a quadric bottom surface or a bottom surface having the shape of a cubic curve or a bottom with a protuberance formed thereon, sensors housed within the case and capable of detecting directions and amounts of rotations of the device body centered on two axes orthogonal to each other, a signal processing section which converts output provided from the sensors into control signals associated with the information processor, and selecting switches for inputting various selection signals.

The "information processor" as referred to herein indicates a system which receives two- or three-dimensional information as signal from the input device and represents the received signal in terms of movement of the cursor or image on the display. Examples include storage and processing apparatus such as personal computer and word processor, and image reproducing apparatus such as television capable of handling two-way communication.

In the input device in question, since the bottom of the case is not plane but is in the shape of quadrics or a surface of third order or is formed with a protuberance, the device body can be rotated around at least two axes orthogonal to each other. As the device body is rotated around those axes, directions and amounts of the rotations are detected by the sensors and output from the sensors is converted by the signal processing section into control signals associated with the information processor. Thus, simply with rotation of the input device in desired directions and amounts by the user, it is possible to input two-dimensional information to the information processor. Unlike a conventional mouse, it is not necessary to move the device body on the operating surface. That is, a flat operating surface is no longer needed.

Preferably, in the above input device, one of the two axes orthogonal to each other is a vertical axis extending in the vertical direction, while the other is a horizontal axis extending in the transverse direction of the device body, and sensor output in rotation around the vertical axis is converted into information in the horizontal direction of the display of the information processor, while sensor output in rotation around the horizontal axis is converted into information in the vertical direction of the display. According to this construction, for example, when the device body is rotated in a horizontal plane around the vertical axis, the cursor on the display moves horizontally, while when the device body is rotated in a vertical plane around the horizontal axis, the cursor moves vertically. A look at this condition from another viewpoint shows that the motion of a straight line extending in the longitudinal direction of the input device and the motion of the cursor are interlocked with each other.

According to the present invention there is also provided an input device for inputting three-dimensional information to an information processor, comprising a case having a bottom a bottom surface having the shape of a cubic curve or a bottom with a protuberance formed thereon, sensors housed within the case and capable of detecting directions and amounts of rotations of the device body centered on three axes orthogonal to one another, a signal processing section which converts signals provided from the sensors into control signals, and selecting switches for inputting various selection signals.

Preferably, in the above input device, the three axes orthogonal to one another are a vertical axis extending in the vertical direction, a first horizontal axis extending in the transverse direction of the device body, and a second horizontal axis extending in the longitudinal direction of the device body, sensor output during rotation around the vertical axis is converted to information in the horizontal direction of the display of the information processor, sensor output during rotation around the first horizontal axis is converted to information in the vertical direction of the display, and sensor output during rotation around the second horizontal axis is converted to information in the direction extending through the plane of the display.

Also as to this input device, the same can be said as the foregoing input device for two-dimensional information. More particularly, since the bottom of the case is a bottom surface having the shape of a cubic curve or has a protuberance, the device body can be rotated around the three axes, and the user is merely required to rotate the device body to input three-dimensional information to the information processor. It is possible to constitute the input device so that the state of rotation of the input device is correlated with the three-dimensional information on the display.

Reference will now be made to characteristics common to both the input device for two-dimensional information and the input device for three-dimensional information according to the present invention. In the case where a selecting switch is disposed so that its operating direction passes through the central axis of a sensor, the sensor does not catch slight rotation of the device body generated upon depression of the selecting switch, whereby it is possible to prevent the cursor from being shifted by operation of the selecting switch. Moreover, the operation feeling can be adjusted to the most suitable feeling by adjusting the curvature of the case bottom or by adjusting the position and size of the protuberance. Further, where the center of gravity of the device body is positioned behind the central point, the upper surface of the device body tilts backward (to this side for the user) while the device body is allowed to stand, so that it is easy to grasp the upper surface (operating surface) and easy to grasp the device body.

DETAILED DESCRIPTION OF PREFERRED EMBODIMENTS

The first embodiment of the present invention will be described below with reference to FIGS. 1 to 6.

Figure 1:
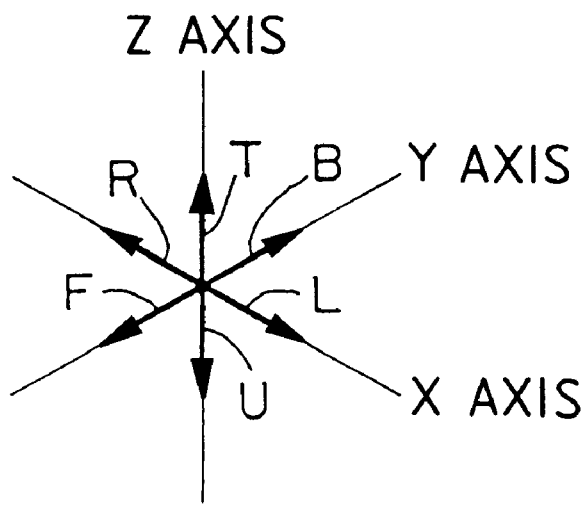
FIG. 1 is a perspective view of an input device according to the first embodiment of the present invention.
Figure 1:
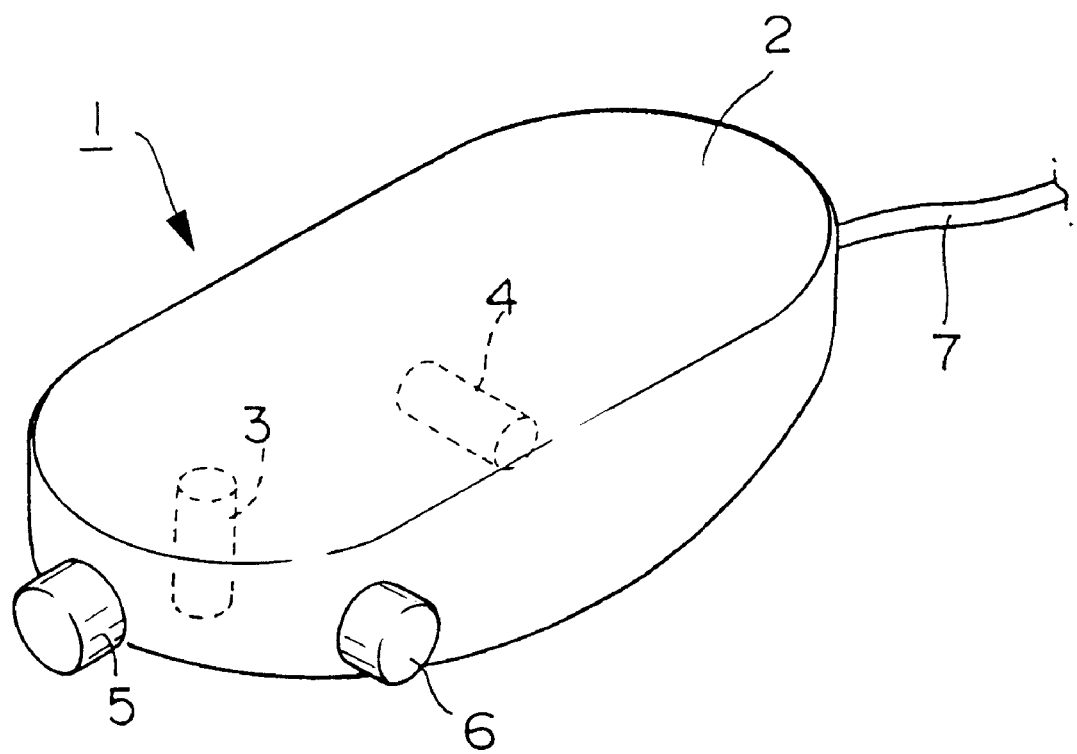

FIG. 1 illustrates the input device of the first embodiment, which device is for the input of two-dimensional information and, for example, is connected to a personal computer to move the cursor on the display or is connected to a television capable of handling two-way communication to select a menu.

As shown in FIG. 1, in this input device, indicated at 1, two angular velocity sensors 3 and 4 and a signal processing section (not shown) are housed within a case which is of a size (about the same size as that of a conventional mouse) capable of being grasped by man, and two selecting switches 5 and 6, as well as cable 7 for connection with a personal computer, are provided. Though not shown, various elements as constituents of the angular velocity sensors and the signal processing section are fixed to a substrate.

In the following description, it is assumed that, when the user grasps the input device 1, the finger-tip side is the front (arrow F, selecting switch 5 side, in FIG. 1) of the input device, the palm side is the rear (arrow B in FIG. 1), the left- and rightward directions when looking from the user are the left side (arrow L in FIG. 1) and the right side (arrow R in FIG. 1), respectively, up and down directions the upper side (arrow T in FIG. 1) and the lower side (arrow U in FIG. 1), respectively, further, the transverse direction is X axis (corresponding to "horizontal axis" in the claims), the longitudinal direction is Y axis, and the vertical direction is Z axis (corresponding to "vertical axis" in the claims).

Figure 2A:
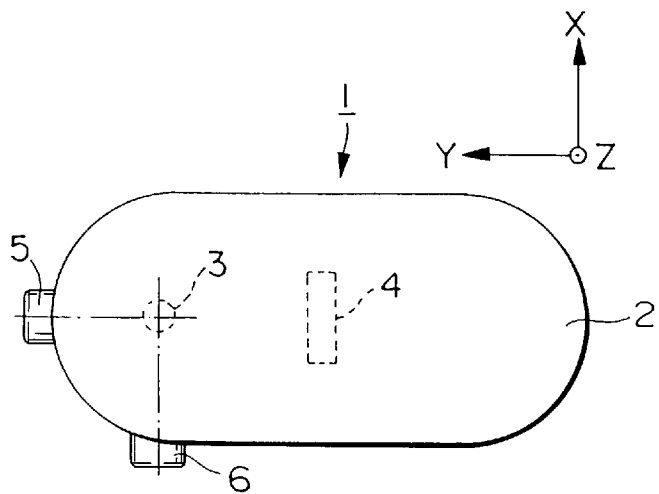
FIGS. 2A, 2B, and 2C are a plan view, a side view, and a front view, respectively, of the input device.
Figure 2B:
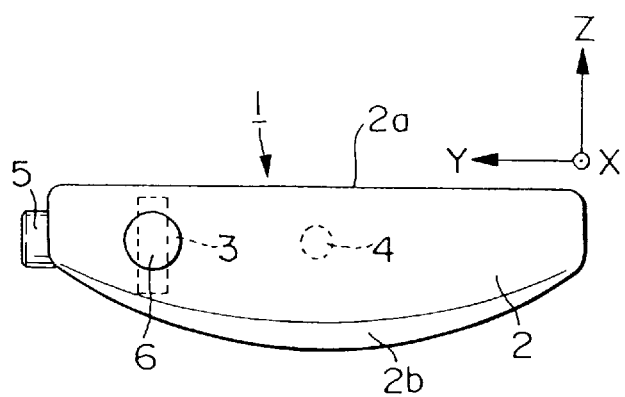
Figure 2C:
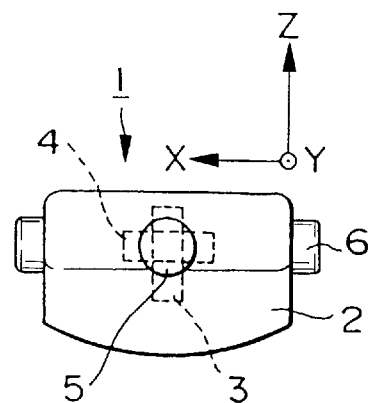

As shown in FIGS. 2A, 2B, and 2C, the case 2 is of an elliptic shape in plan and is formed of resin for example. It has a flat upper surface 2a and a bottom 2b which is a bottom surface having the shape of a cubic curve having a gentle curvature. The center of gravity of the input device 1 is positioned almost centrally of the device body. Therefore, when the input device 1 is placed on a plane, the device substantially comes into point contact with the plane at the central point or thereabout of the bottom 2b. When the user grasps the input device 1 and tries to rotate the device, the device rotates easily in any of three planes around the three axes orthogonal to one another, that is, a horizontal plane (around Z axis), a vertical plane (around X axis) in the longitudinal direction of the input device, and a vertical plane (around Y axis) in the transverse direction of the input device.

As the sensors there may be used any of various known sensors if only they can detect directions and amounts of rotation. In this embodiment, angular velocity sensors of a cylindrical shape utilizing gyroscope are used. The angular velocity sensors each detect an angular velocity created by rotation around the central axis of the cylindrical shape and outputs a voltage signal proportional thereto. Of the two angular velocity sensors, the first angular velocity sensor 3 disposed on the front side of the input device is for detecting rotation in the horizontal plane (rotation around Z axis) of the input device and it is fixed so that the central axis thereof extends along Z axis. On the other hand, the second angular velocity sensor 4 disposed on the rear side of the input device 1 is for detecting rotation in the vertical plane (rotation around X axis) in the longitudinal direction of the input device and its central axis is fixed so as to extend along X axis.

Figure 3:
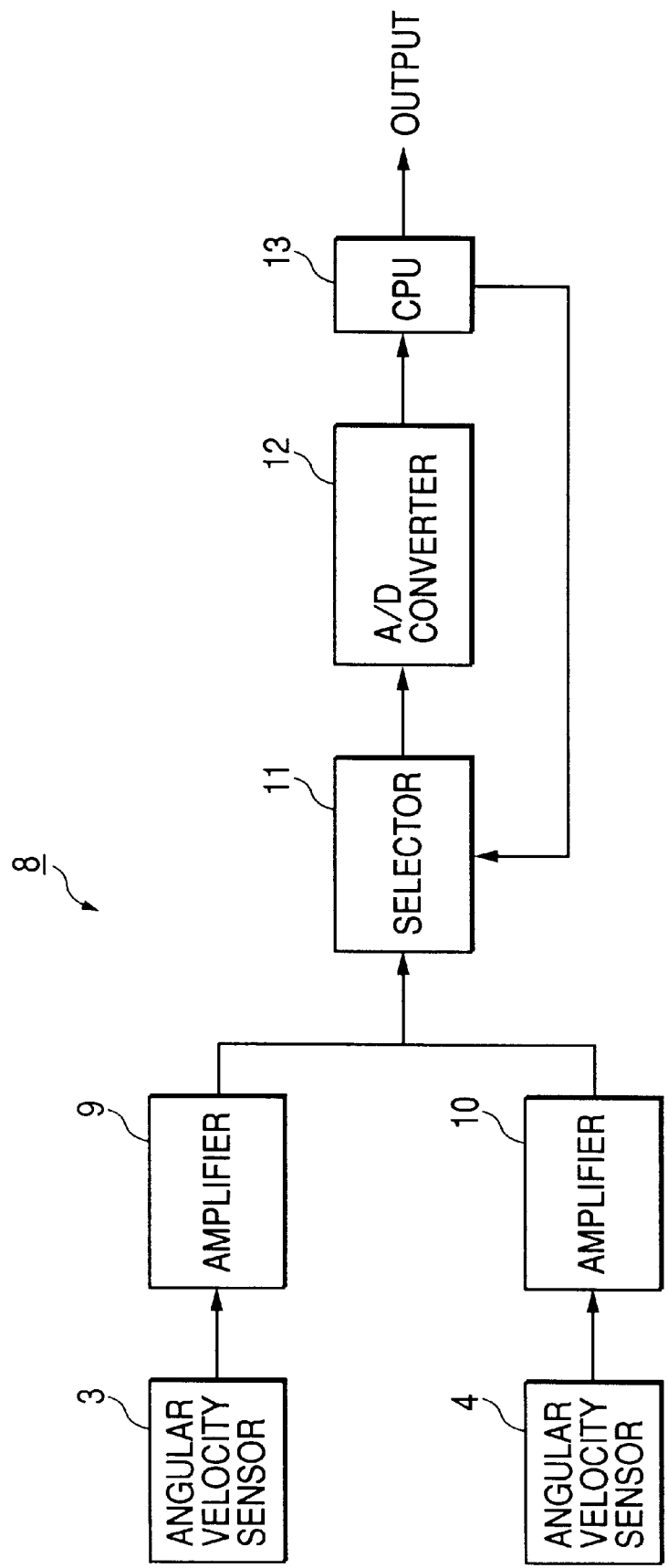
FIG. 3 is a diagram showing the construction of a signal processing section in the input device.

As shown in FIG. 3, a signal processing section 8 comprises amplifiers 9 and 10 connected to the angular velocity sensors 3 and 4, respectively, a selector 11, an A/D converter 12, and a CPU 13. In the signal processing section 8, the voltage signals outputted from the angular velocity sensors 3 and 4 are amplified by the amplifiers 9 and 10 and then, out of the two output signals, the one to be processed is selected by the selector 11. The signal thus selected is digitized by the A/D converter and is then subjected to an arithmetic processing in the CPU 13, in which the digitized signal is converted, for example, into a control signal for moving the cursor on the display of the personal computer. In the signal processing section 8, signal output in rotation around Z axis of the input device 1 is converted to a cursor control signal in the horizontal direction of the display of the personal computer, while sensor output in rotation around X axis is converted to a cursor control signal in the vertical direction of the display.

As shown in FIG. 2A, the selecting switches 5 and 6 are attached respectively to the front end portion and the left side portion of the device body in such a manner that their axes pass through the axis of the first angular velocity sensor. The selecting switches 5 and 6 are disposed in positions where the forefinger and thumb of the user can reach the switches easily when grasping the device body from above.

The following description is now provided about how to use the input device 1.

After the cable 7 of the input device 1 has been connected to a terminal of a personal computer for example, the user grasps the input device 1 from above which device is placed on a desk, and then rotates the input device in a desired direction to operate the cursor on the display of the personal computer. In this case, the rotating direction of the input device 1 and the motion of the cursor are in a relation such that when the input device is rotated around Z axis, the cursor moves horizontally on the display, while when the input device is rotated around X axis, the cursor moves vertically. Thus, the motion of the tip of the input device 1 and the motion of the cursor are interlocked with each other.

Figure 4A:
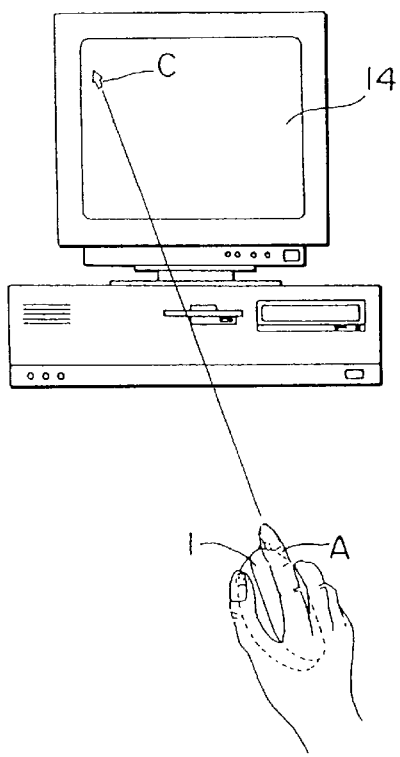
FIGS. 4A and 4B are diagrams for explaining how to use the input device.
Figure 4B:
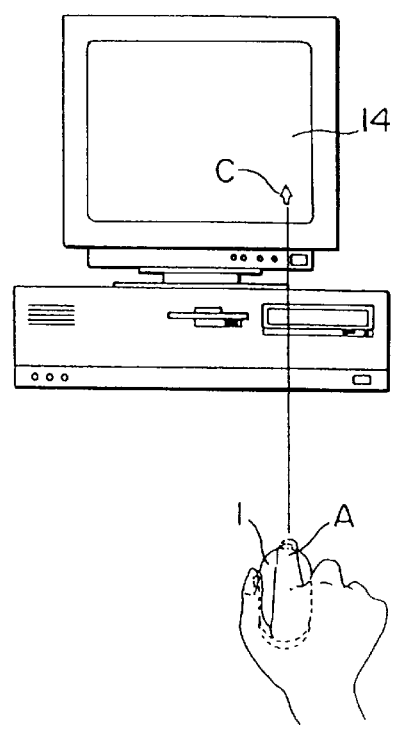

Therefore, as shown in FIG. 4A, when the user grasps the input device 1 so that his or her forefinger A faces the tip of the input device and then points to, for example, an upper left position on the display, the cursor, indicated at C, comes to be positioned on an extension line of the forefinger A. When the cursor C is to be moved from the upper left position to a lower right position, the wrist is turned so that the forefinger A faces the lower right position on the display indicated at 14, while the input device 1 is allowed to rest, as shown in FIG. 4B. As a result, the cursor C moves with the movement of the forefinger A. In this way the cursor C is moved to a desired position. The selection of menu can be done by depressing a selecting switch in the same manner as with a conventional mouse.

In the input device 1 of this embodiment, since the angular velocity sensors 3 and 4 are incorporated therein and rotation of the device body is converted to a cursor control signal, it is not necessary to move the device itself on the desk, unlike a conventional mouse, and hence a flat operating surface having a predetermined area is no longer needed. Therefore, the device is employable even if there is not a wide space on the desk, or it is employable on a thigh while the user sits on a chair. Thus, since the device is employable while being rested on the desk or on a thigh, the user does not get tired even in a long-time operation. In the input device 1, moreover, the bottom 2b of the case 2 is substantially in point contact with the desk or a thigh, and the device body can rotate freely in any direction, thus scarcely requiring any force in rotating the device body. Further, unlike a conventional mouse, a ball is not used, so there is no fear of malfunction which would occur in the event of unsatisfactory transfer of ball rotation.

According to the input device 1 of this embodiment, as mentioned above in connection with the method for using the input device, when the cursor C is to be moved in a desired direction, it can be moved feeling as if the direction were pointed on the display 14 by the forefinger A. Thus, unlike a conventional mouse whose longitudinal movement causes a vertical movement of the cursor, the user does not have a sense of incongruity in his or her directional feeling, and the cursor C can be operated with a feeling closer to the human sense.

The construction of the input device 1 is such that the rotation of the device body is detected and therefore, for example in the event the device rotates contrary to the user's will upon operation of a switch, there occurs an inconvenience that the cursor deviates from a desired position. In the input device 1 of this embodiment, however, since the two selecting switches 5 and 6 are disposed on the axis of the first angular velocity sensor 3, the sensor 3 does not catch a slight rotation in the horizontal plane (around Z axis) which occurs upon depression of the selecting switch 5(6). Thus, it is possible to prevent the cursor C from being positionally deviated by operation of the selecting switches 5 and 6.

Although in the input device 1 of this embodiment the bottom 2 of the case 2 is a bottom surface having the shape of a cubic curve, a modification may be made such that only the shape of the case bottom is changed into a quadric surface as in FIG. 5 while leaving the interior construction intact.

Figure 5A:
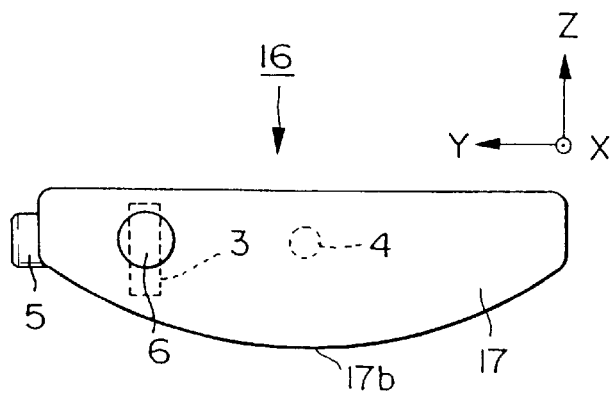
FIGS. 5A and 5B are a side view and a front view, respectively, of an input device according to a modification of the first embodiment.
Figure 5B:
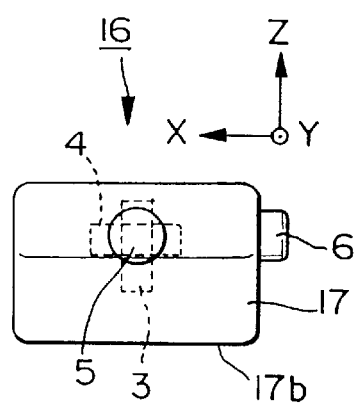

More specifically, in the case of an input device 16 shown in FIGS. 5A and 5B, a bottom 17b of a case 17 is in the shape of a part of an outer surface of a cylinder not having any curvature in the transverse (X axis) direction of the device 16 but having a central axis facing in the transverse (X axis) direction. Therefore, when the input device 16 is placed on a plane, the device 16 and the plane come into the state of linear contact, not point contact.

Consequently, in the input device 16 being considered, the freedom of rotation is diminished in comparison with the input device 1 of the first embodiment, and since rotation is inhibited in the vertical plane (around Y axis) extending in the transverse direction of the input device, it becomes relatively easy to effect rotation in the horizontal plane (around Z axis) and that in the vertical plane (around X axis) extending in the longitudinal direction each in an independent manner. As a result, the free operation feeling in rotation is somewhat deteriorated, but for example in the case of selecting one of menus arranged horizontally on the display of the personal computer and then selecting one of menus arranged vertically on the display, it is easy to perform a two-stage operation consisting of first moving the cursor in the horizontal direction and then moving it in the vertical direction. Since the input device 16 is constructed so as not to detect rotation around Y axis, even a failure to rotate in the direction of Y axis does not pose a problem in point of function of the input device.

In constituting the input device in question, all that is required is rotation of the device around both X and Z axes. That is, the bottom of the case is not always required to be in the shape of a curved surface. There may be adopted such a construction as shown in FIG. 6, in which a protuberance is formed on the bottom of the case.

Figure 6:
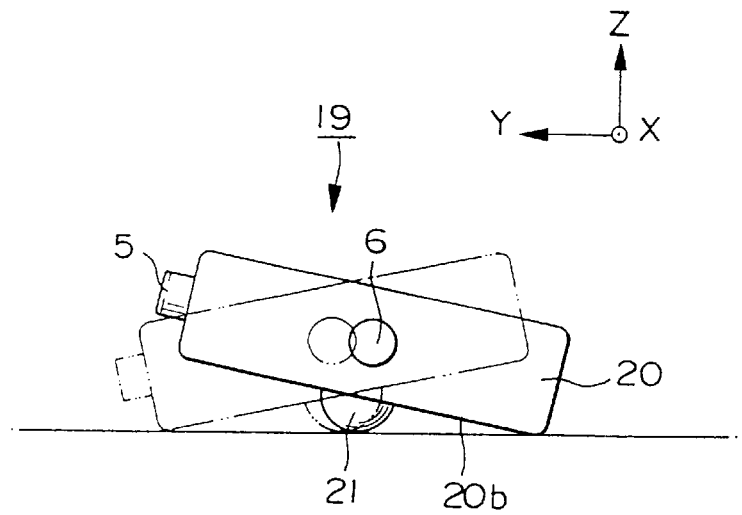
FIG. 6 is a side view of an input device according to another modification of the first embodiment.

To be more specific, in the input device shown in FIG. 6 and indicated at 19, a semispherical protuberance 21 is formed centrally on a flat case bottom 20b so that the input device rotates in all the directions of X, Y, and Z axes with the protuberance 21 as a fulcrum (indicated by a dash-double dot line in FIG. 6). Therefore, the input device 19 can also afford the same effect as in the case with the input device 1 described previously.

The second embodiment of the present invention will be described below with reference to FIG. 7.

The input device of the second embodiment shown in FIG. 7 is capable of inputting three-dimensional information. For example, when a three-dimensional image on the display of a personal computer is rotated in a three-dimensional manner, the input device exhibits the function of instructing the direction and amount of the rotation.

Figure 7A:
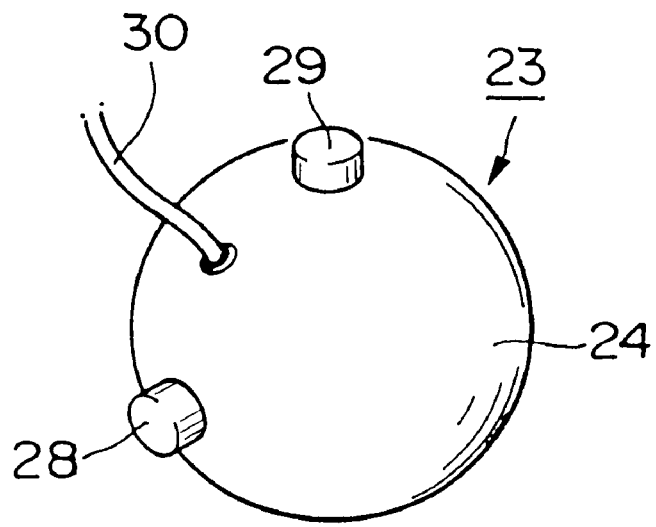
FIGS. 7A and 7B are a perspective view and a plan view, respectively, showing an input device according to the second embodiment of the present invention.
Figure 7B:
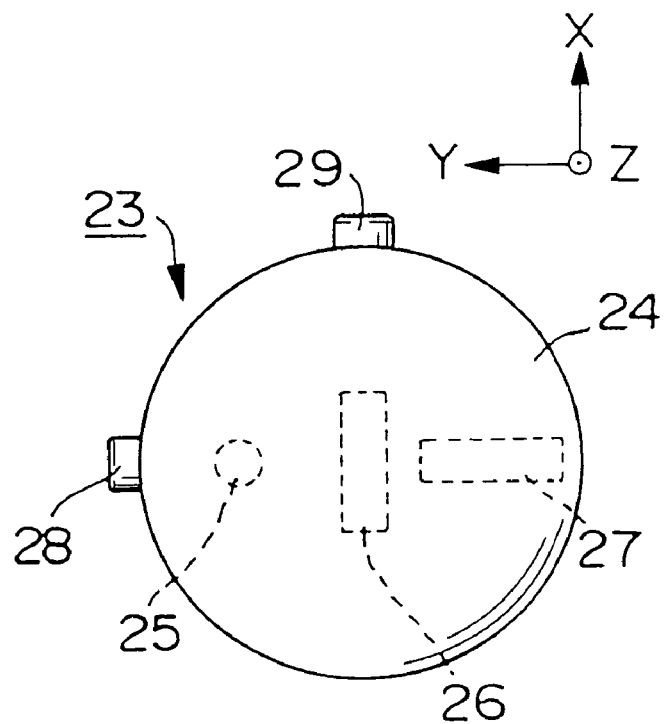

As shown in FIGS. 7A and 7B, the input device, indicated at 23, incorporates three angular velocity sensors 25, 26, 27 and a signal processing section (not shown) in a spherical case 24 and is further provided with two selecting switches 28, 29 and a cable 30 for connection to the personal computer.

Longitudinal, transverse, and vertical directions (axes) of the input device 23 are defined in the same way as in the first embodiment (Z, X, and Y axes correspond respectively to "vertical axis," "first horizontal axis," and "second horizontal axis" which are defined in the claims).

Since the case 24 used in this embodiment is spherical, when the input device 23 is placed on a plane, the bottom side of the case 24 and the plane substantially come into the state of point contact, so that easy rotation is ensured in any direction, including a flat plane (around 2 axis), a vertical plane (around X axis) in the longitudinal direction of the input device 23, and a vertical plane (around Y axis) in the transverse direction of the input device.

The angular velocity sensors used in the input device of this second embodiment are the same as those used in the input device of the first embodiment. Of the three angular velocity sensors, the first angular velocity sensor 25 disposed on the front side of the input device 23 is for detecting rotation in a horizontal plane (rotation around Z axis) of the input device and its central axis is fixed along Z axis. The second angular velocity sensor 26 disposed centrally of the input device 23 is for detecting rotation in a vertical plane (rotation around X axis) in the longitudinal direction of the input device and its central axis is fixed along X axis. The third angular velocity sensor 27 disposed on the rear side of the input device 23 is for detecting rotation in a vertical plane (rotation around Y axis) in the transverse direction of the input device and its central axis is fixed along Y axis.

The signal processing section used in this embodiment is of the same construction as in the first embodiment except that the number of amplifiers used is three correspondingly to the three angular velocity sensors. According to the construction of the signal processing section, signal output in rotation around Z axis of the input device 23 is converted to a control signal in the horizontal direction of the display of the personal computer, sensor output in rotation around X axis is converted to a control signal in the vertical direction of the display, and sensor output in rotation around Y axis is converted to a control signal in the direction extending through the display.

Where a three-dimensional image on the display is to be rotated in a three-dimensional manner and the direction and amount of the rotation are to be instructed using the input device 23, the input device is rested on a desk or on a thigh and in this state the user puts his or her hand onto the input device and then rolls the device. Alternatively, the user can grasp the input device 23 and rotate it within a space. In this case, if the input device 23 is rotated in a direction in which the image is to be rotated and by an angle at which the image is to be rotated, the image will rotate correspondingly.

Thus, also in the case of the input device 23 of this embodiment, like the input device of the first embodiment, input of three-dimensional information requires only a rotating operation, so that a wide operating surface is not needed, and the device is employable in a small space on a desk, or on a thigh, or in space. Besides, as mentioned above, all that is required for rotating a three-dimensional image in a desired direction at a desired angle is only rotating the input device 23 by the user with a feeling as if the user rotated the image by his or her hand. In this point, it can be said that the input device of this embodiment can be operated with a feeling extremely close to the human sense though it handles three-dimensional information which is a still higher order of information.

Although the shape of the case 24 used in the input device 23 of this embodiment is spherical, no limitation is placed thereon. The bottom may be a semispherical curved surface or in the shape of any surface of third order, or a protuberance may be formed on the bottom.

The technical scope of the present invention is not limited to the first and second embodiments above, but various modifications may be made within the scope not deviating from the gist of the present invention. For example, although in the first embodiment it has been described that the center of gravity of the input device 1 is positioned almost centrally of the device body, an adjustment may be made so that the center of gravity lies at a position close to the rear side. In this case, the upper surface of the input device when left standing tilts backward (to this side of the user), so that it is easy to recognize the upper surface (operating surface) and the device can be grasped easily. By adjusting the curvature of the bottom of the input device if the bottom has a curved surface, or by adjusting the position and size of a protuberance if the protuberance is formed on the bottom of the input device, thereby adjusting the motion of the cursor according to the degree of rotation of the device, it is made possible to improve the operation feeling.

Further, although the input devices of the above embodiments are each provided with a cable for connection with such an apparatus as a personal computer, there may be adopted a wireless construction not having a cable wherein a control signal produced by the input device is sent to an information processor by infrared communication or high-frequency communication. According to the wireless construction, since the freedom of rotation further increases, the advantage of the input device of the present invention can be utilized more effectively. It goes without saying that as to the planar shape and size of the case and the number and mounting position of selecting switches, they are not limited to those described in the above embodiments but that design modifications may be made as necessary.

According to the construction of the input device of the present invention, as set forth in detail hereinabove, since sensors capable of detecting rotations of the device body are mounted within the device body and output of the sensors is converted to control signals, it is not necessary to move the entire device on a desk as required for a conventional mouse, and hence a flat operating surface is not needed. Thus, the input device of the present invention can be used on a desk not having a wide space or on a thigh of the user. Therefore, the input device of the invention is employable easily without the user being tired even in a long-time operation. Moreover, unlike a conventional mouse, since there is not used any ball, a malfunction caused by the use of a ball does not occur.

Further, when the user inputs two- or three-dimensional information, more specifically, when the cursor on the display of a personal computer is to be moved to a desired position, or when a three-dimensional image is to be rotated in a desired direction, the user can perform the operation in a more sensuous manner without racking his or her brains. For example, in using the input device of the present invention, as compared with the use of a conventional mouse, the user does not have a sense of incongruity in his or her directional feeling and can perform the operation with a feeling closer to the human sensitivity. Thus, the input device of the present invention is very easy to use for both beginners not accustomed to handling a personal computer and the like and those accustomed to such handling. The input device of the invention is very suitable for use as a pointing device in a storage and processing apparatus such as a personal computer which will come into wider use not only for business but also in homes at large, further, for use as a menu selector in an image reproducing apparatus such as television, as a pointing device for presentation, etc.

What is claimed is:

1. An input device for inputting two-dimensional information to an information processor, comprising:

a case having a bottom, said bottom being selected from one of a group consisting of a quadric bottom surface, a bottom surface having the shape of a cubic curve, and a bottom with a protuberance formed thereon;

sensors housed within said case and adapted to detect directions and amounts of rotations of a body of the input device centered on two axes orthogonal to each other;

a signal processing section adapted to convert output from said sensors into control signals associated with said information processor; and selecting switches adapted to input various selection signals;

wherein one of said two axes orthogonal to each other is a vertical axis extending in a vertical direction and the other is a horizontal axis extending in a transverse direction of the device body;

sensor output in rotation around said vertical axis is converted into information in a horizontal direction of a display of said information processor, and sensor output in rotation around said horizontal axis is converted into information in a vertical direction of said display; and a support member abuts the bottom of the case during operation and provides a surface for rotation of the input device, rotation occurs around one of a group consisting of the quadric bottom surface, the cubic curved bottom surface, and the protuberance, and the amounts of rotation are converted into information for the display.

2. An input device according to claim 1, wherein said selecting switches are disposed so that their operating directions pass through a central axis of any of said sensors.

3. An input device according to claim 1, wherein the curvature of the bottom of said case or the position and size of said protuberance of the case are optimized.

4. An input device according to claim 1, wherein the center of gravity of said device body is positioned on a rear side relative to the central point.

5. An input device for inputting three-dimensional information to an information processor, comprising:

a case having a bottom, said bottom being selected from one of a group consisting of a quadric bottom surface, a bottom surface having the shape of a cubic curve, and a bottom with a protuberance formed thereon;

sensors housed within said case and adapted to detect directions and amounts of rotations of a body of the input device centered on three axes orthogonal to one another;

a signal processing section adapted to convert output from said sensors into control signals associated with said information processor; and selecting switches adapted to input various selection signals;

wherein said three orthogonal axes are a vertical axis extending in a vertical direction, a first horizontal axis extending in a transverse direction of the device body, and a second horizontal axis extending in a longitudinal direction of the device body; and sensor output in rotation around said vertical axis is converted into information in a horizontal direction of a display of said information processor, sensor output in rotation around said first horizontal axis is converted into information in a vertical direction of said display, and sensor output in rotation around said second horizontal axis is converted into information in a direction extending through said display.

6. An input device according to claim 5, wherein said selecting switches are disposed so that their operating directions pass through a central axis of any of said sensors.

7. An input device according to claim 5, wherein the center of gravity of the device body is positioned on a rear side relative to the central point.

* * * * *

UNITED STATES PATENT AND TRADEMARK OFFICE
CERTIFICATE OF CORRECTION

PATENT NO. : 6,130,664  
DATED : October 10, 2000  
INVENTOR(S) : Katsutoshi Suzuki Page 1 of 1

It is certified that error appears in the above-identified patent and that said Letters Patent is hereby corrected as shown below:

<u>Title page,</u>
<u>Column 2,</u>
Line 6, under "ABSTRACT", change "bottom a bottom surface" to -- bottom surface --.

Signed and Sealed this

Twenty-sixth Day of March, 2002

Attest:

*Attesting Officer*

JAMES E. ROGAN  
*Director of the United States Patent and Trademark Office*